(No Model.)
F. HEPPNER.
ROUGHING ATTACHMENT FOR HORSESHOES.
No. 576,816. Patented Feb. 9, 1897.
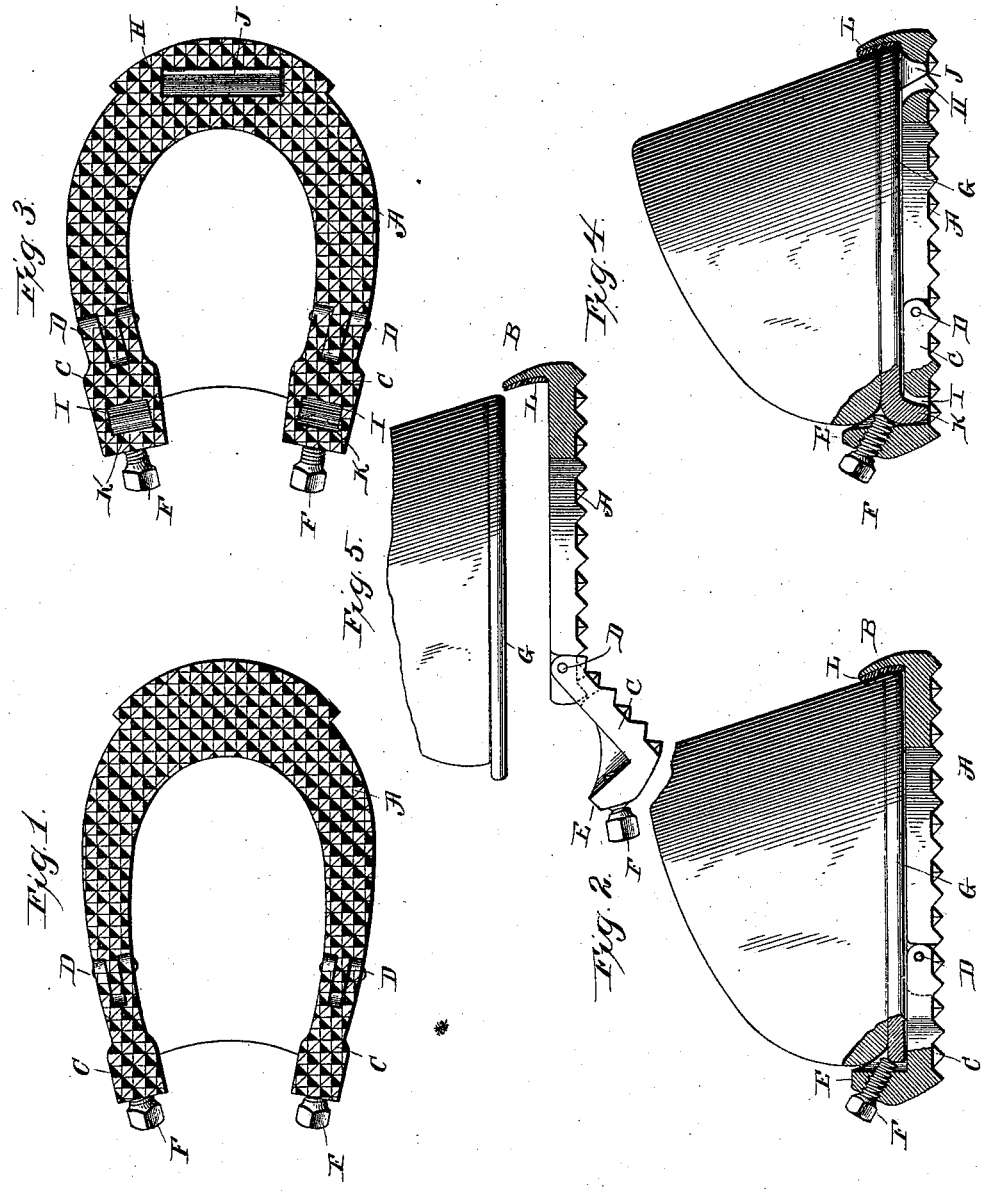
Witnesses
E. C. Wurdeman
J. J. Williamson
Inventor
Frederick Heppner
by Geo. H. Holgate
Attorney

UNITED STATES PATENT OFFICE.

FREDERICK HEPPNER, OF NEW YORK, N. Y.

ROUGHING ATTACHMENT FOR HORSESHOES.

SPECIFICATION forming part of Letters Patent No. 576,816, dated February 9, 1897.

Application filed July 31, 1896. Serial No. 601,143. (No model.)

*To all whom it may concern:*

Be it known that I, FREDERICK HEPPNER, a citizen of the United States, residing at New York, in the county of New York and State of New York, have invented a certain new and useful Improvement in Roughing Attachments for Horseshoes, of which the following is a specification.

My invention relates to a new and useful improvement in horseshoe-rougheners, and has for its object to provide a device of this description which may be readily attached to a horseshoe while upon the foot of the horse and be removed therefrom when occasion requires without interfering with said shoe, thus permitting the rough-shodding of a horse upon short notice and without the services of a blacksmith, as well as the removal of the rougheners at any time.

With these ends in view this invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawings, forming a part of this specification, in which—

Figure 1 is a bottom plan of a horse's hoof having my improvement attached to the shoe thereof; Fig. 2, an elevation of such a hoof and shoe, the roughener being in section; Fig. 3, a slightly-modified form of my improvement; Fig. 4, a section thereof, and Fig. 5 a view showing the method of applying the device.

In carrying out my invention as embodied in Figs. 1 and 2, A represents the main section of the roughener, which is made of approximately the same shape as the horseshoe and has formed therewith a toe-clip B, adapted to project above the shoe and bear thereon, as well as upon the forward portion of the hoof, and, if found necessary, a rubber or other washer may be interposed between said clip and hoof.

To the rear ends of the section A are pivoted the extensions C and D, in order that they may be either swung into line with the section A or out of line therewith, and these extensions have the lugs E projecting upward therefrom, through which are threaded the set-bolts F, adapted to bear against the heels of the shoe G upon such an angle as to draw the clip B tightly against the toe of the shoe and hoof, thereby securing the roughener in place, and when thus secured it will be seen that the roughener may not be accidentally removed until the set-screws have been backed off. By this arrangement a set of rougheners may be attached to the shoes while upon the horse's hoofs with little exertion and loss of time, and when occasion requires they may be again removed. This is of great advantage, since in many climates the use for a roughener extends over only a portion of a day, and by the old method it is necessary to remove the shoes from a horse to weld corks or rougheners thereon, and when the occasion for the use of said corks or rougheners has temporarily passed it is not practical to remove the same, and the horse is therefore left rough-shod when it is not desirable, a further disadvantage being that during the period when the roughener is not required and is still kept in use the edges thereof become dulled and rounded, so that when they are again necessary they are almost useless, requiring their removal and the substitution therefor of other rougheners, which again necessitates the removal of the shoes from the hoofs, and in time this process is very detrimental to said hoofs, as is well known by those skilled in the art.

In the modification shown in Figs. 3 and 4 the roughener has a slot H formed in the forward portion thereof and slots I formed in the extensions, so that the calks J and K may project through the slots, respectively, thereby adapting my improvement for use in connection with calked shoes.

My improvement may be applied to any shape shoe, as it does not of necessity have to conform to such shape, and the variance in the length of the shoe is compensated for by the length of the bolts F.

Having thus fully described my invention, what I claim as new and useful is—

1. A roughener for horseshoes, consisting of a main section, a clip formed therewith, extensions hinged vertically to the main section, and means for securing the roughener to the shoe, as and for the purpose described.

2. A roughener for horseshoes, consisting of a main section, a clip projecting upward and backward from the forward part of the section, extensions hinged vertically to said section, lugs projecting upward from said extensions, set-bolts threaded through said lugs at an angle to secure the roughener to the shoe, as and for the purpose described.

3. A roughener for horseshoes, consisting of a main section, a clip projecting upward from said section, extensions hinged vertically to the main section, lugs projecting upward from said extensions, set-bolts threaded through said lugs at an angle to secure the roughener to the shoe, said roughener having slots formed therethrough for the passage of the calks of a shoe, substantially as described.

In testimony whereof I have hereunto affixed my signature in the presence of two subscribing witnesses.

FREDERICK HEPPNER.

Witnesses:
S. S. WILLIAMSON,
MARK BUFORD.